United States Patent
Lipsky et al.

(10) Patent No.: US 6,956,589 B2
(45) Date of Patent: Oct. 18, 2005

(54) METHOD AND SYSTEM FOR SPECIFYING ZOOM SIZE

(75) Inventors: Scott E. Lipsky, Seattle, WA (US); Paul Brownlow, Seattle, WA (US)

(73) Assignee: Beon Media Inc., Seattle, WA (US)

( * ) Notice: Subject to any disclaimer, the term of this patent is extended or adjusted under 35 U.S.C. 154(b) by 43 days.

(21) Appl. No.: 10/704,186

(22) Filed: Nov. 7, 2003

(65) Prior Publication Data

US 2005/0068339 A1 Mar. 31, 2005

Related U.S. Application Data

(63) Continuation-in-part of application No. 10/675,925, filed on Sep. 29, 2003.

(51) Int. Cl.[7] ............................................. G06G 5/00
(52) U.S. Cl. ........................................ 345/667; 345/672
(58) Field of Search ................................ 345/672, 678, 345/680, 682, 959, 473, 684, 667; 382/293, 294; 715/784, 788, 720

(56) References Cited

U.S. PATENT DOCUMENTS

| | | | |
|---|---|---|---|
| 5,428,721 A | | 6/1995 | Sato et al. |
| 5,929,867 A | * | 7/1999 | Herbstman et al. ......... 345/474 |
| 6,587,119 B1 | * | 7/2003 | Anderson et al. ........... 345/672 |
| 2004/0239681 A1 | | 12/2004 | Robotham et al. |
| 2004/0268413 A1 | | 12/2004 | Reid et al. |

OTHER PUBLICATIONS

O'Shea, J., "Power Point 97 Introduction (Windows 95) ActiveLeam Series", Ziff–Davis Education, Student Manual, 1998, (8 pages).

* cited by examiner

*Primary Examiner*—Michael Razavi
*Assistant Examiner*—Michelle K. Lay
(74) *Attorney, Agent, or Firm*—Perkins Coie LLP

(57) ABSTRACT

A method and system for generating an image display plan is provided. In one embodiment, a planning system allows a user to create a display plan that specifies a sequence of images that are to be displayed and how the images are to be displayed. The planning system allows a user to specify different versions of the plan for different aspect ratios. When displaying the image, the planning system may display multiple viewports simultaneously on the image, one for each of the different aspect ratios. The planning system may allow the multiple viewports to be moved around and resized as a unit maintaining a common center point for the viewports.

35 Claims, 12 Drawing Sheets

METHOD AND SYSTEM FOR SPECIFYING ZOOM SIZE

CROSS-REFERENCE TO RELATED APPLICATIONS

This application is a continuation-in-part of U.S. application Ser. No. 10/675,925 (407438001US) entitled, "Method and System for Distributing Images to Client Systems," filed on Sep. 29, 2003, which is hereby incorporated by reference. This application is also related to the following U.S. applications filed on Nov. 7, 2003, which are hereby incorporated by reference.

| U.S. Application No. | Title |
| --- | --- |
| ___(407438002US) | Method and System for Displaying Multiple Aspect Ratios of a Viewport |
| ___(407438002US1) | Method and System for Specifying a Pan Path |
| ___(407438002US2) | Method and System for Specifying Pan Speed |
| ___(407438002US3) | Method and System for Specifying Zoom Speed |
| ___(407438002US5) | Method and System for Specifying Color of a Fill Area |
| ___(407438002US6) | Method and System for Generating Image Display Plans |

TECHNICAL FIELD

The described technology relates generally to displaying images and generating plans for controlling the display of images.

BACKGROUND

The displaying of paintings, sketches, photographs, and other images is very popular in business and personal settings. For example, most homes and offices have paintings or photographs on their walls. It can be very expensive, however, to purchase, maintain, and display high-quality paintings—so much so that most businesses and families choose not to do so. As a result, most images that are displayed are low-cost reproductions of high-quality images or originals of low-quality paintings. Because viewers can tire of seeing the same painting on a daily basis, some businesses change the location of the paintings that they display to provide more variety to their customers and employees.

Various electronic means have been used to display image to help reduce the cost of displaying images and increase the variety of images that are displayed. For example, slide programs for general-purpose computers have been developed to display images (e.g., stored in JPEG format) on display device such as a computer monitor. These slide shows typically cycle through displaying a set of images (e.g., defined by a display list) at a fixed rate. Some electronic frames have been developed that allow a user to upload their own photographs for display on a screen within the frame. These electronic frames can, much like a slide show program, cycle through displaying a set of photographs. It can be a time-consuming process, however, to change the set of images that are displayed either by a slide show program or an electronic picture frame. To change a set of images, a person may need to search for, pay for, and download an electronic version of an image and create a display list that includes that image.

These current means for displaying images have disadvantages that relate to the difficulty of specifying the images that are to be displayed and how they are displayed. It would be desirable to have a user-friendly technique for allowing a user to specify a complex plan that defines how images are to be sequenced, transitioned, panned, zoomed, and so on.

DETAILED DESCRIPTION

Figure 1:
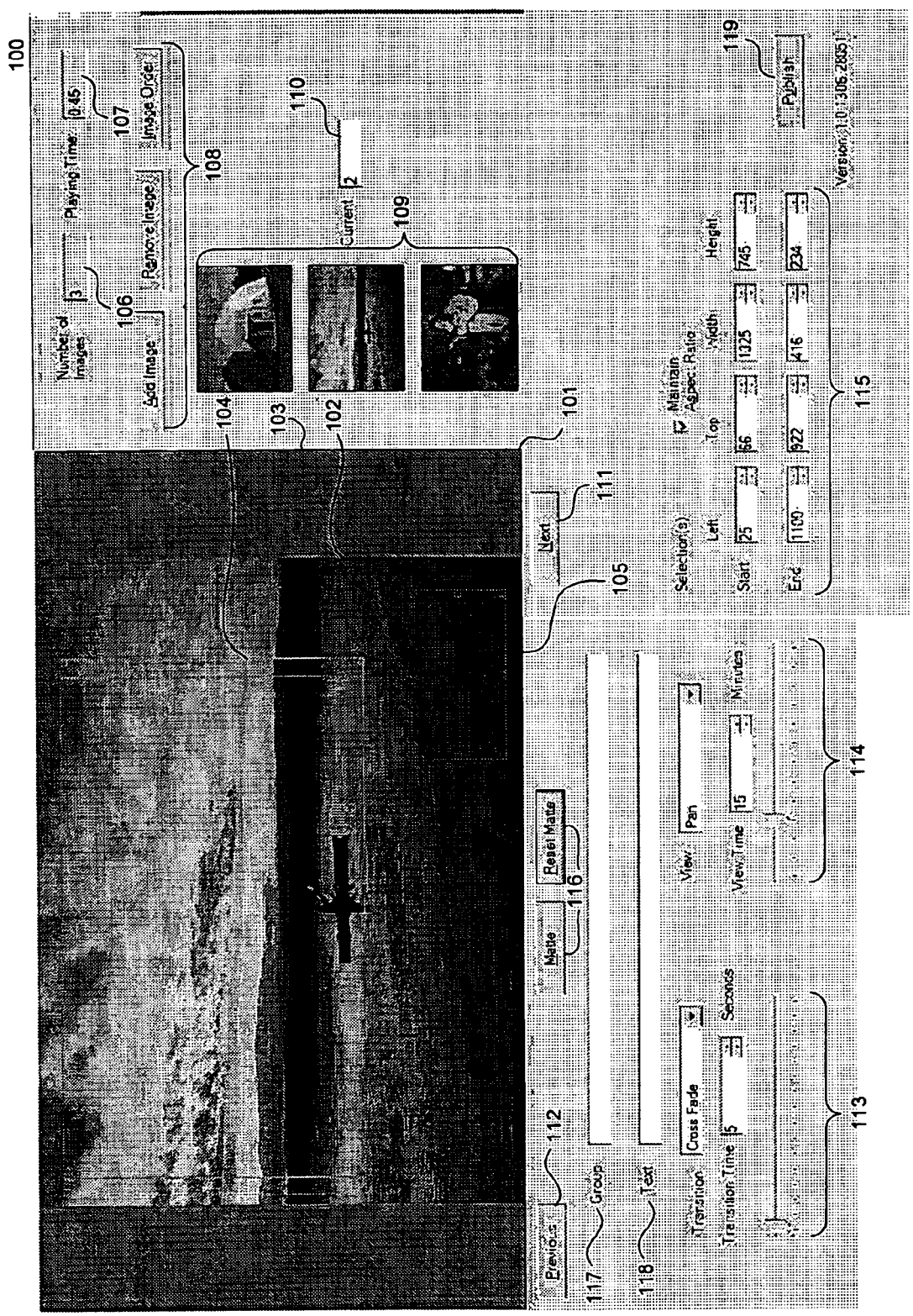
FIG. 1 is a display page illustrating a user interface of the planning system in one embodiment.

A method and system for generating an image display plan is provided. In one embodiment, a planning system allows a user to create a display plan that specifies a sequence of images that are to be displayed and how the images are to be displayed. For each image in a plan, the plan may specify a viewport for the image (i.e., portion of the image to be displayed), the type and speed of transitioning from one image to the next, the time of display of each image, and so on. The planning system may allow a user to specify the aspect ratio of the viewport. For example, the aspect ratio may be 16:9 for a wide-screen display and 4:3 for a conventional display. After the plan is specified, the planning system allows the user to publish the plan by generating a plan document, which may be in XML format, describing the plan. The plan document may be executed by a display device controller to display images in accordance with the plan. To allow a user to specify a plan, the planning system displays an image that is to be included in the plan and displays over the image a rectangle representing the viewport with the desired aspect ratio. The planning system allows a user to move the viewport around the image to select the portion of the image to be displayed and allows the user to resize the viewport while maintaining its aspect ratio. In one embodiment, the planning system allows a user to specify different versions of the plan for different aspect ratios. When displaying the image, the planning system may display multiple viewports simultaneously on the image, one for each of the different aspect ratios. For example, if a user specifies viewports with an aspect ratio of 16:9 and 4:3, then the planning system may display these viewports centered at the same location (e.g., pixel) of the image. In one embodiment, the horizontal or vertical size (i.e., a dimension) of the viewports may be the same. For example, a 16:9 viewport may have a horizontal size of 160 pixels and a vertical size of 90 pixels. If the horizontal size of the viewports are the same, then a 4:3 viewport would have a horizontal size of 160 and a vertical size of 120. The planning system may allow the multiple viewports to be moved around and resized as a unit maintaining a common center point for the viewports. Alternatively, the planning system may allow a user to specify different center points for each viewport. For example, a 16:9 viewport and a 4:3 viewport may share the same upper-left pixel, in which case their center points would be different. In such a case, the viewports can be also moved around and resized as a unit. When a user specifies to publish the plan, the planning system may create a separate plan document for each aspect ratio. In this way, the planning system allows a user to view at the same time the portions of the image that will be included in the plans for different aspect ratios.

In another embodiment, the planning system allows a user to specify a sequence of viewports to effect the panning of an image. The planning system may allow a user specify a start viewport and an end viewport that define the bounds of panning. For example, a user may specify a start viewport located in the upper-left corner of the image and specify an end viewport in the lower-right corner of the image. While the image is displayed by a display device controller, the viewport successively moves from the upper-left corner to the lower-right corner of the image to effect the panning. If the start viewport is smaller than the end viewport, then the panning includes a zoom out. Conversely, if the start viewport is larger than the end viewport, then the panning includes a zoom in. If the start viewport and the end viewport are different sizes centered at the same location, then the zoom in or zoom out is effected without panning.

In one embodiment, the planning system may allow a user to specify the pan path between the start viewport and the end viewport. The pan path defines the path of the viewports. The default pan path may be a straight line between the center points of the start viewport and the end viewport. The planning system may allow a user to specify an arbitrary function that defines the pan path. For example, a user may specify that the pan path takes the shape of an "S." The input to the function may be the current percent of pan time with the output being the location of the center point of the viewport for that percent of the total pan time.

The planning system may also allow a user to specify a variable pan speed and zoom speed. For example, a user may specify that the time between successive changes in the center point of the viewport occurs at a faster rate (i.e., pan speed acceleration) as of the displayed viewport approaches the end viewport. Similarly, the planning system may allow a user to specify a variable zoom speed that indicates the speed at which the viewport zooms in or out. Both the pan speed and the zoom speed can each be specified by arbitrary functions. The speed functions may input time and output the percent of path or zoom that is to occur at that time. For example, when panning occurs, a display device controller may, at certain time intervals, invoke the pan speed function passing the current percent of the total pan time and receiving the percent of the pan path that should be traveled by that time. The display device controller then invokes the path function passing the percent and receiving the centerpoint associated with that percent of the pan path.

In one embodiment, the planning system may allow a user to specify the size of a viewport during zooming. The default may be that the rate of change from the start viewport size to the end viewport size may be constant over the zoom time. A user may specify a function defining the zoom size (viewport size) based on zoom time or based on the distance of the pan path. The function may be non-linear. For example, the zoom size function may specify that the zoom size very quickly approaches the end viewport size and stays that size for the duration of the zoom or pan time.

FIG. 1 is a display page illustrating a user interface of the planning system in one embodiment. The display page 100 includes image area 101 on which is displayed image 102 along with background area 103. The image is displayed in its base aspect ratio, which corresponds to the number of pixels in the horizontal and vertical directions that are used to represent the image. In this example, the background area is filled with a color that corresponds to the average of the colors of the image. Viewport 104 illustrates the location and size of the start viewport, and viewport 105 illustrates the location and size of the end viewport. In this example, a 16:10 viewport and a 16:9 viewport are displayed with a common center point and horizontally aligned. The outline of the viewports includes various handles for use in resizing the viewport. In this example, the vertical borders of the end viewports are shown as a single line since the horizontal dimensions of the viewports are nearly the same. In this example, the user has selected three images 109 for the plan. The number of images field 106 indicates that the plan currently contains three images, and the playing time field 107 indicates that the total playing time for the plan is 45 minutes. The user may use buttons 108 to add images to, remove images from, and reorder images of the plan. The current field 110 identifies the number of the image that is currently displayed in image area 101. The planning system allows the user to use the next button 111 and the previous button 112 to browse through the images of the plan. The transition fields 113 allow the user to specify the type of transition from one image to the next image. The pan fields 114 allow the user to specify the pan time. The start and end viewport fields 115 specify the location and size of the start and end viewports. A user may specify the location and size of the viewport using the viewport fields or by dragging the outlines of the viewports and resizing the viewports using the handles. The matte and reset matte buttons 116 are used to specify the background color for the image. In one embodiment, the reset matte button allows a user to use a color of a matte that is the average of the colors of the image. The matte button may allow a user to specify the specific color to be used as a background. The group field 117 allows a user to define a group of images to be treated as a unit when displayed by the display device controller. For example, if a display device controller has a display next image function then when the images of a group are being displayed and a user selects the next image function, the remaining images of the group are skipped. The images of a group may be different views of the same image or different images. The text field 118 allows the user to specify information about the image. For example, the information may include title, author, date of creation, and so on. The display device controller may display this information before, during, or after the associated image is displayed. In one embodiment, the display device controller may display the information on a display device that is different from the one on which the images are displayed. The text field may also allow entry of a reference to a file that contains the information (e.g., in XML format) or a file that defines a display page (e.g., HTML document) to control the displaying of the information. The planning system allows a user to publish or create a plan document by selecting the publish button 119.

Figure 2A:
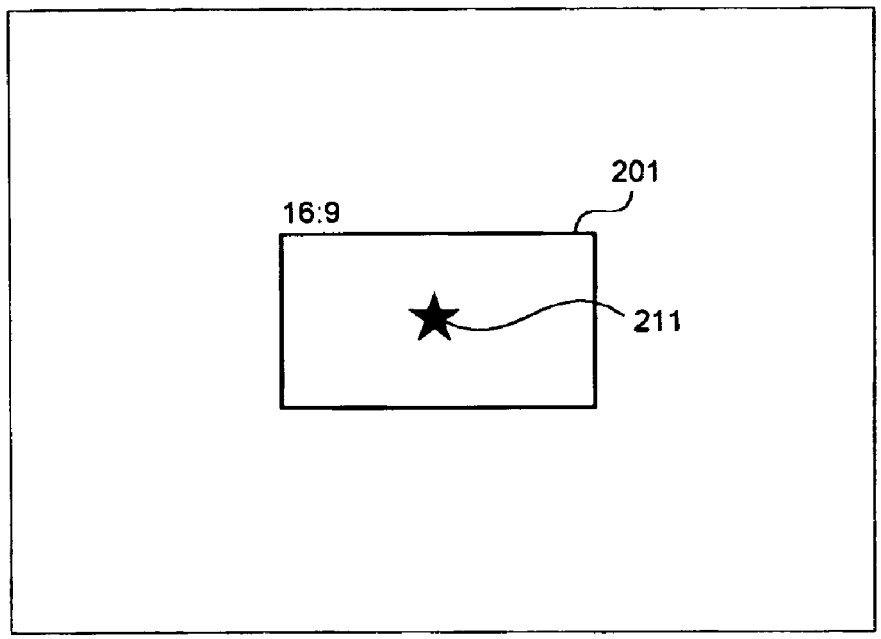
FIGS. 2A–2F illustrate the manipulation of viewports in one embodiment.
Figure 2B:
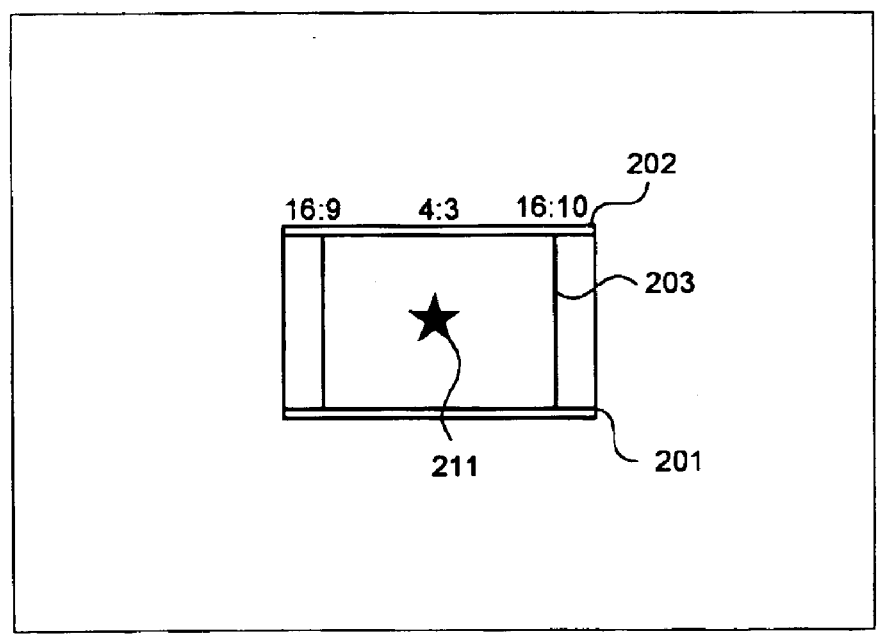
Figure 2C:
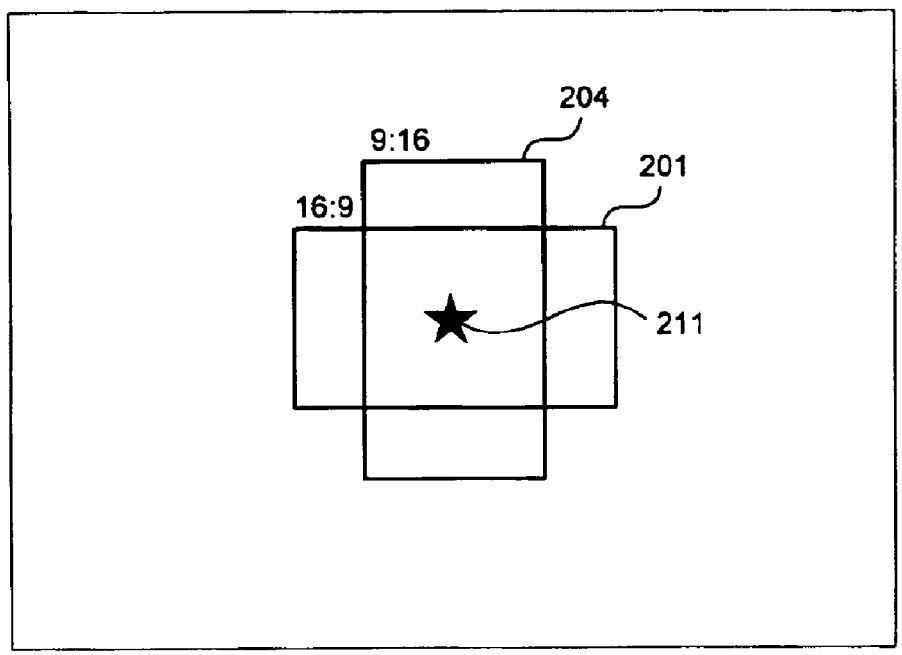
Figure 2D:
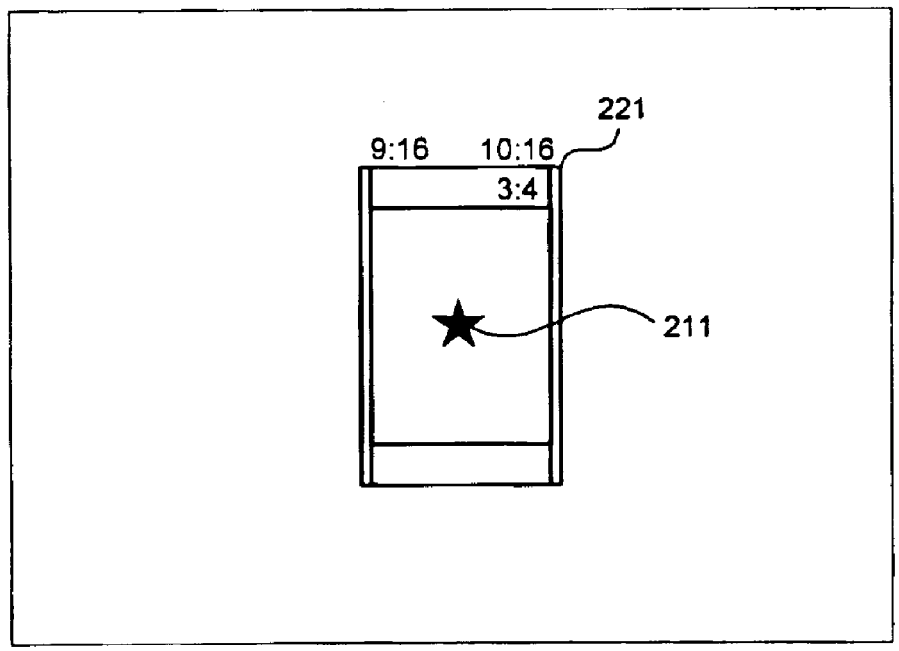
Figure 2E:
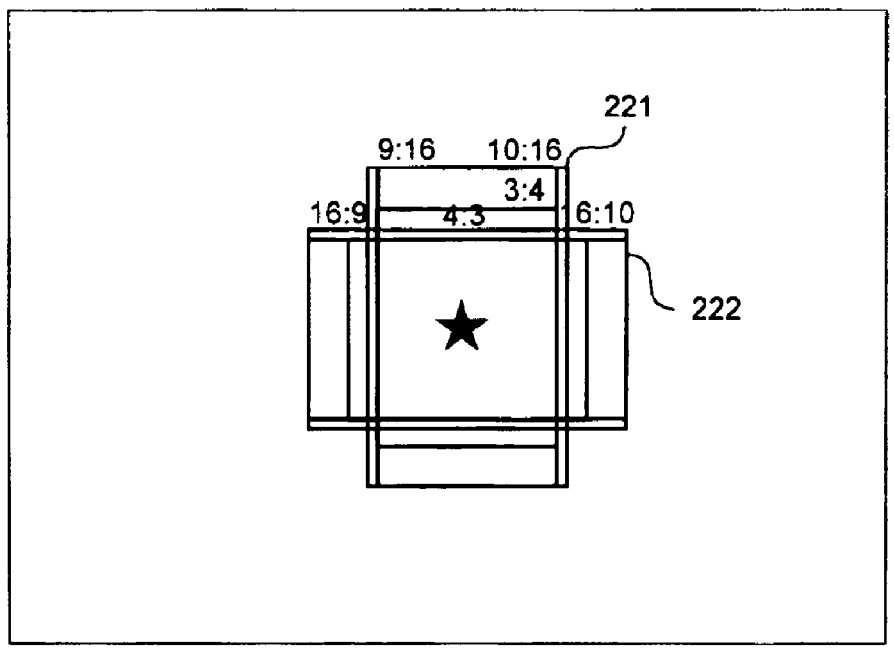
Figure 2F:
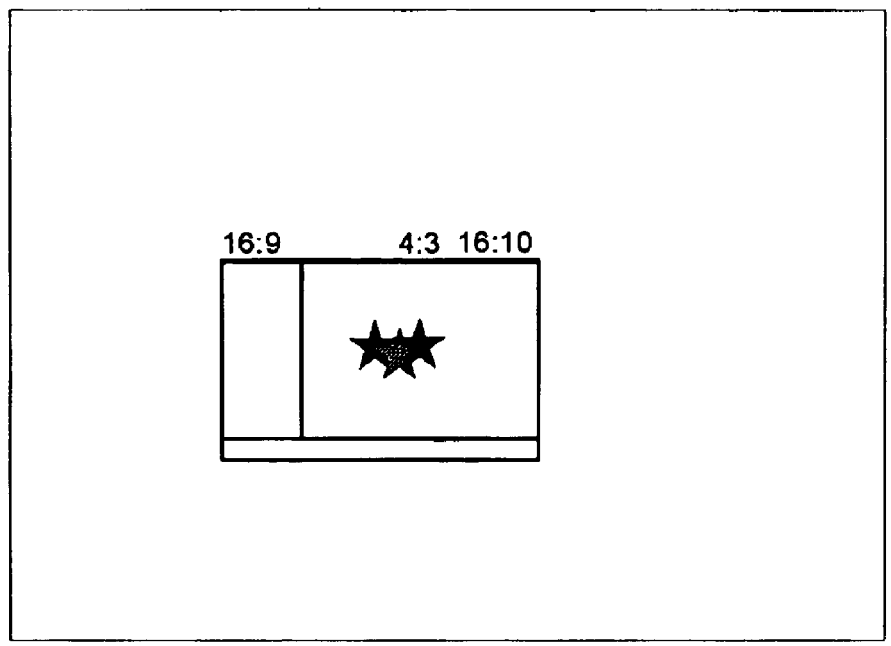

FIGS. 2A–2F illustrate the manipulation of viewports in one embodiment. FIG. 2A illustrates the display of a single viewport in one embodiment. The viewport 201 has a 16:9 aspect ratio and is centered at center point 211 over the image. A user may select the viewport 201 to resize the viewport or move the viewport around the image. FIG. 2B illustrates a display of multiple viewports in one embodiment. The viewport 201 has a 16:9 aspect ratio and is displayed at center point 211. In this example, a 16:10 viewport 202 and a 4:3 viewport 203 are also displayed. The 16:10 and 16:9 of viewports are vertically aligned, and the 4:3 viewport is horizontally aligned with the 16:9 viewport. The viewports can be sized as a group and may be displayed in different colors. FIG. 2C illustrates a display of a viewport in multiple modes (e.g., landscape or portrait). In this example, the 16:9 viewport 201 and a 9:16 viewport 204 are displayed at the center point 211. The 16:9 viewport represents a landscape mode, and the 9:16 viewport represent a portrait mode. FIG. 2D illustrates a display of multiple viewports in portrait mode. In this example, the viewports 221 are in portrait mode and correspond to the viewports of FIG. 2B. FIG. 2E illustrates the display of multiple viewports in both landscape mode and portrait mode. The viewports 221 are in portrait mode, and the corresponding viewports 222 are in landscape mode. The planning system may allow all the viewports to be adjusted (e.g., moved and resized) simultaneously as a group. Alternatively, the planning system may allow the landscape mode viewports to be moved or resized separately from the portrait mode viewports. FIG. 2F illustrates multiple viewports that do not share a centerpoint. In this example, a 16:9 viewport, a 16:10 viewport, and a 4:3 viewport share the same upper-right corner and thus do not share the same center point.

Figure 3:
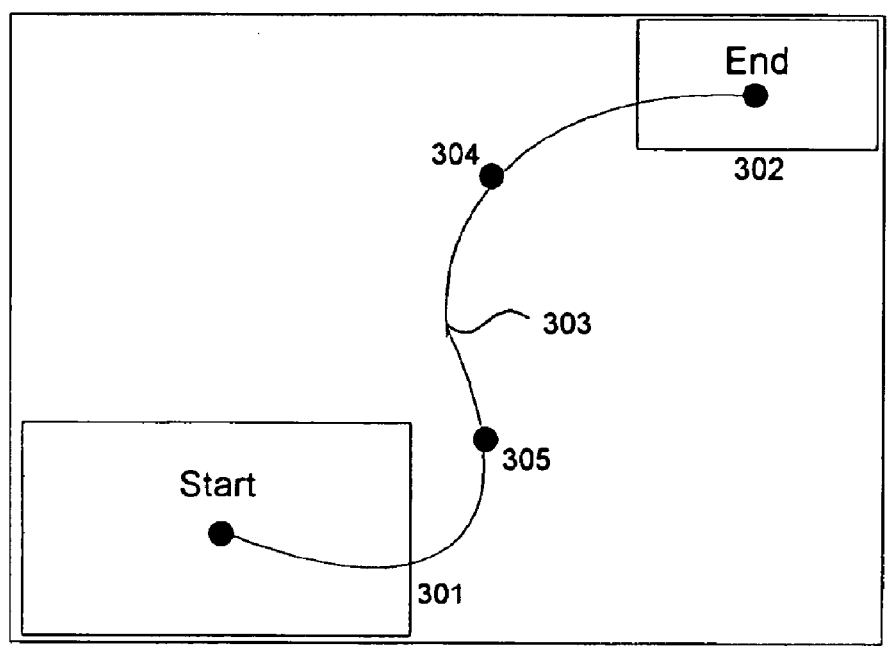
FIG. 3 illustrates a display page for setting a pan path into one embodiment.

FIG. 3 illustrates a display page for setting a pan path in one embodiment. The start viewport 301 and the end viewport 302 are connected via a line 303. Initially, the line is displayed as a straight line between the center point of the start viewport and the center point of the end viewport. The line includes control points 304 and 305. The straight line between the center points indicates the default pan path in one embodiment. A user may select the control points to alter the pan path. In this example, the user has selected control point 305 and moved it to the lower right and has selected control point 304 and moved it to the upper left to effect an "S" pan path. The control points and the center points may be curve fitted using a spline curve. One skilled in the art will appreciate that the pan path may be specified by an arbitrary function. For example, if the center point of the end viewport is the center of the image, then a spiral pan path function may be used as to show the viewport spiraling in towards the center of the image. Alternatively, complex zooming and panning may be effected by a sequence of viewports over the same image. For example, the user may specify a start and end viewport along with intermediate viewports of an image and an arbitrary pan path between each pair of successive viewports. One skilled in the art will appreciate that a similar effect may be obtained by having a plan with duplicate images in which the end viewport in one image is the start viewport of the duplicate image.

Figure 4A:
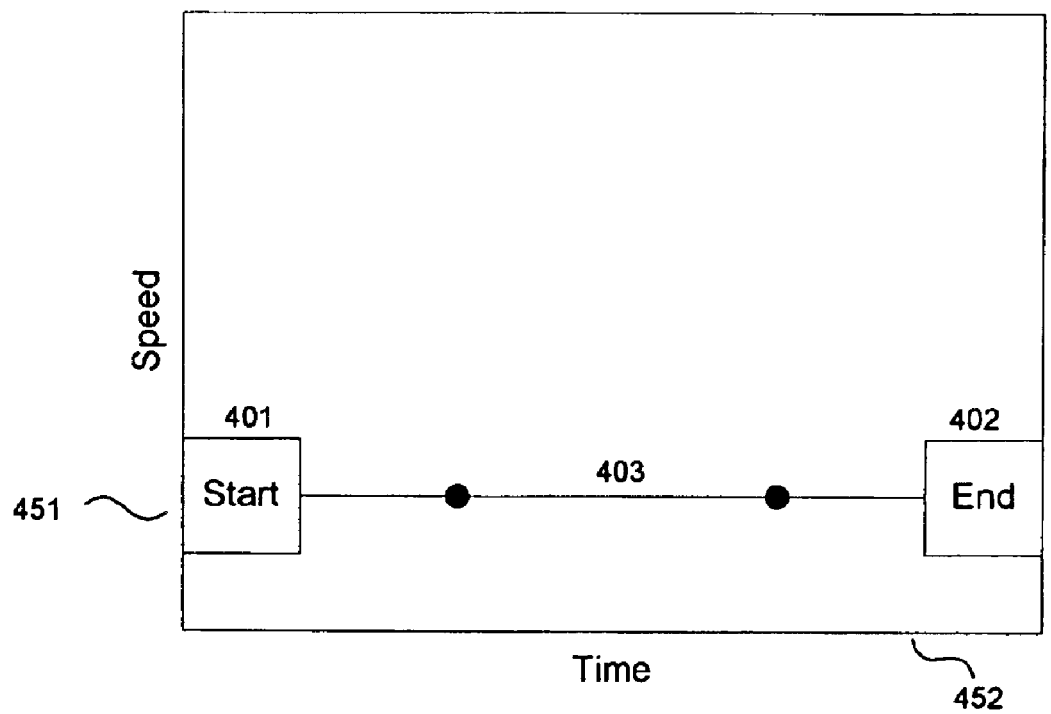
FIGS. 4A–4C illustrate display pages for setting the pan speed in one embodiment.
Figure 4B:
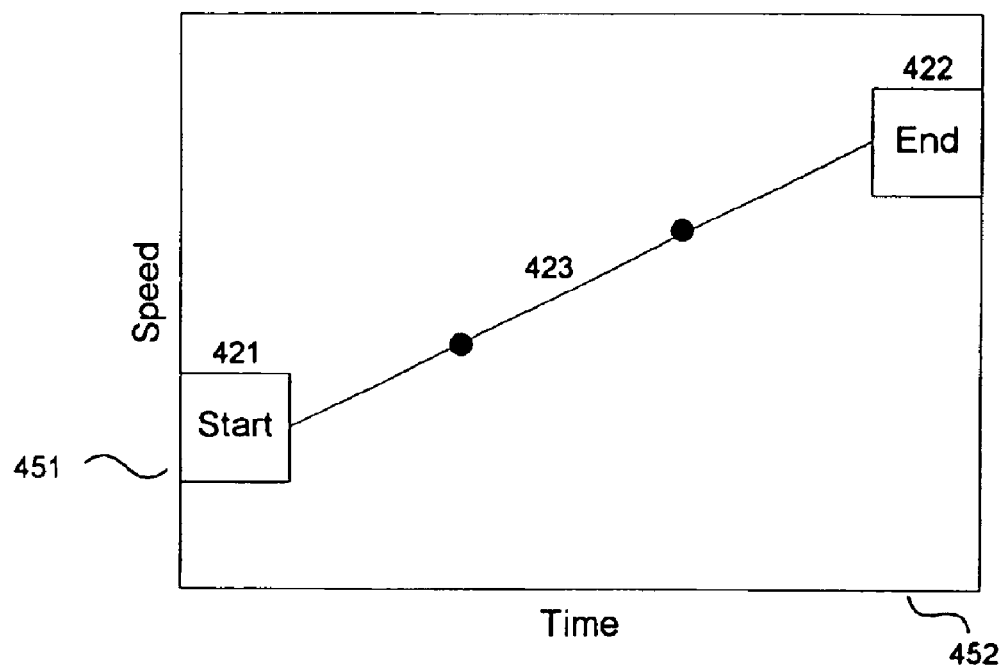
Figure 4C:
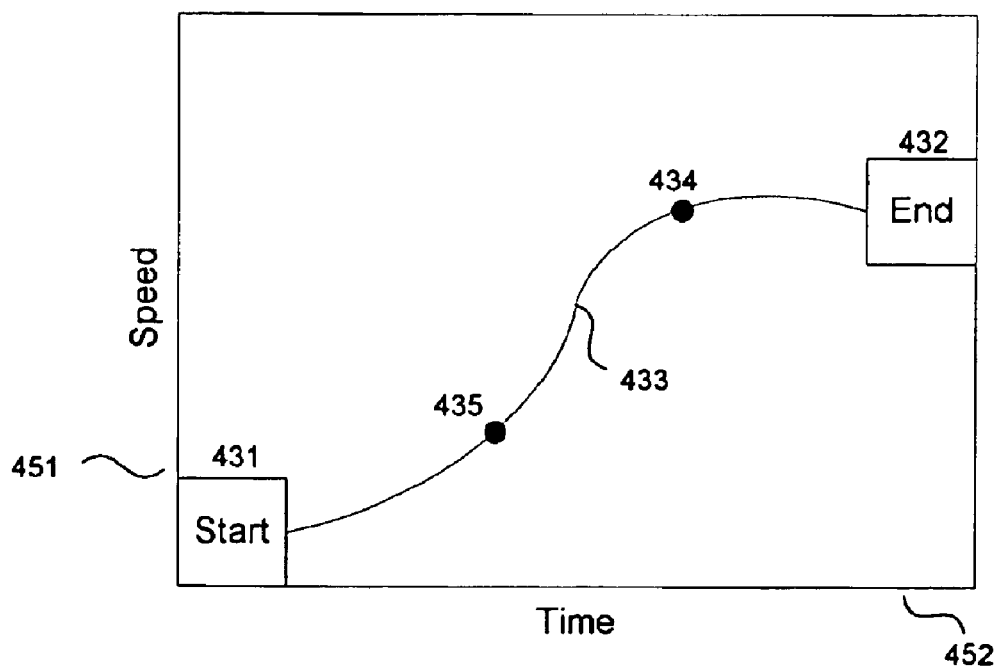

FIGS. 4A–4C illustrate display pages for setting the pan speed in one embodiment. FIG. 4A illustrates a display page with a constant pan speed specified. The display page includes a start viewport 401 and an end viewport 402 connected by a speed line 403. The speed line represents speed in the y coordinate 451 as a function of time in the x coordinate 452. The x coordinate represents the pan time (e.g., 15 minutes) to pan from the start viewport to the end viewport over the pan path. In this example, since the line is horizontal, the pan speed is constant over the pan time. FIG. 4B illustrates a display page with a linearly increasing pan speed. In this example, the start viewport 421 is positioned at a low speed and at the end viewport 422 is positioned at a high speed. Line 423 illustrates the increase in pan speed when panning from the start viewport to the end viewport. A user may move the start viewport or the end viewport up or down to change the acceleration of the panning. FIG. 4C illustrates a display page with an acceleration that varies non-linearly over the pan time. In this example, the start viewport 431 is positioned at a low speed, and the end viewport 432 is positioned at a high speed. The line 433 was initially a straight line between the start viewport and the end viewport. A user moved control points 434 and 435 to alter the shape of the line (including its slope) and thus the pan speed over the pan time. The planning system adjusts the speed function so that the average speed of the panning is maintained. Although not illustrated, one skilled in the art will appreciate that the zoom speed can be specified by a user in a similar manner. Also, a user may provide an arbitrary function to control the pan and zoom speeds.

Table 1 provides a sample plan document in XML format. This sample plan specifies to transition into "image1" and display for 900 seconds, to fade into "image2" and then pan around "image2" for 900 seconds, and to fade into "image3" and then hold for 900 seconds. The first xfade element indicates to transition over 5 seconds from the current screen image to the "image" at offset 0,0 with a width of 1366 and height of 768 (i.e., 16:9 aspect ratio) and hold for 900 seconds. The second xfade element indicates to transition over 5 seconds from the current image (i.e., "image1") to "image2" at offset 24,68 and hold for 5 seconds. The pan element indicates to pan over 900 seconds from the start viewport (i.e. offset 26, 68) to the end viewport (i.e., offset 3610,3026) of "image2." The display element indicates to display the current image (i.e., "image2") at the offsets (i.e., panned to location) for 5 seconds. The last xfade element indicates to transition over 5 seconds to "image3" at offset 0,0 and hold for 900 seconds. The backgroundcolor element specifies the color of the matte. The group element is used for defining a group of images. The info element is used to specify the information of the text field.

TABLE 1

```
<?xml version="1.0" encoding="utf-8" ?>
<RGBImageScript>
    <Xfade>
        <Group></Group>
        <Duration>5</Duration>
        <Hold>900</Hold>
        <Width>1366</Width>
        <Height>768</Height>
        <OffsetX>0</OffsetX>
        <OffsetY>0</OffsetY>
        <StartImage>
            <Path>Screen</Path>
        </StartImage>
        <EndImage>
            <Path> (16x9) Image1.tif</Path>
            <BackgroundColor>0x617082</BackgroundColor>
        </EndImage>
        <Info></Info>
    </Xfade>
    <Xfade>
        <Group></Group>
        <Duration>5</Duration>
        <Hold>5</Hold>
        <Width>1366</Width>
        <Height>768</Height>
        <OffsetX>26</OffsetX>
        <OffsetY>68</OffsetY>
        <StartImage>
            <Path>Screen</Path>
        </StartImage>
        <EndImage>
            <Path> (16x9) Image2.tif</Path>
```

TABLE 1-continued

```
            <BackgroundColor>0x637690</BackgroundColor>
        </EndImage>
        <Info></Info>
    </Xfade>
    <Pan>
        <Group></Group>
        <Duration>900</Duration>
        <StartX>26</StartX>
        <StartY>68</StartY>
        <EndX>3610</EndX>
        <EndY>3026</EndY>
        <StartWidth>1366</StartWidth>
        <EndWidth>1366</EndWidth>
        <StartHeight>768</StartHeight>
        <EndHeight>768</EndHeight>
        <RGBImage>
            <BackgroundColor>0x637690</BackgroundColor>
            <Path> (16x9) Image2.tif</Path>
        </RGBImage>
        <Info></Info>
    </Pan>
    <Display>
        <Group></Group>
        <Duration>5</Duration>
        <Width>1366</Width>
        <Height>768</Height>
        <OffsetX>3610</OffsetX>
        <OffsetY>3026</OffsetY>
        <RGBImage>
            <Path>Screen</Path>
            <BackgroundColor>0x637690</BackgroundColor>
        </RGBImage>
        <Info></Info>
    </Display>
    <Xfade>
        <Group></Group>
        <Duration>5</Duration>
        <Hold>900</Hold>
        <Width>1364</Width>
        <Height>768</Height>
        <OffsetX>0</OffsetX>
        <OffsetY>0</OffsetY>
        <StartImage>
            <Path>Screen</Path>
        </StartImage>
        <EndImage>
            <Path> (16x9) Image3.tif</Path>
            <BackgroundColor>0x473522</BackgroundColor>
        </EndImage>
        <Info></Info>
    </Xfade>
</RGBImageScript>
```

A user may specify the zoom size by changing the shape of a line connecting an indication of the start and end viewports that is displayed on a coordinate system with the x-axis representing zoom time or pan path distance and the y-axis representing zoom size. Referring to FIG. 4C, the zoom size can be specified in a similar manner when the y-axis represents zoom size, rather than speed. Also, the sizes of the indicators of the start and end viewports 431 and 432 may represent the relative sizes of the viewports themselves and may include the content of the viewport. A user may specify the start and end size of a viewport by dragging the indicators of the start and end viewports.

The planning system may execute on a computer system that includes a central processing unit, memory, input devices (e.g., keyboard and pointing devices), output devices (e.g., display devices), and storage devices (e.g., disk drives). The memory and storage devices are computer-readable media that may contain instructions that implement the planning system. In addition, the data structures and message structures may be stored or transmitted via a data transmission medium, such as a signal on a communications link. Various communications links may be used, such as the Internet, a local area network, a wide area network, or a point-to-point dial-up connection for distribution of the plan documents.

Figure 6:
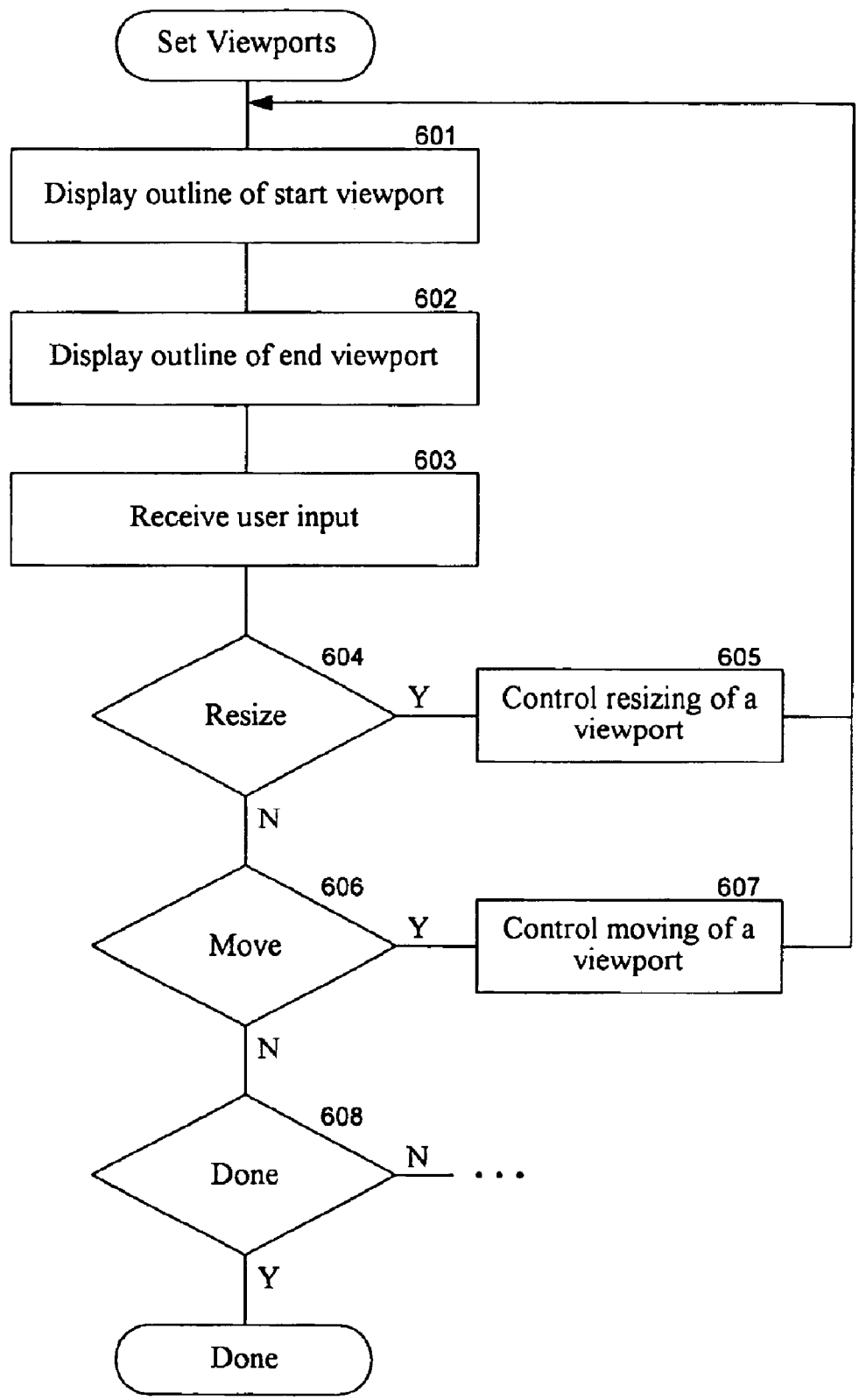
FIG. 6 is a flow diagram illustrating the processing of the set viewports component in one embodiment.

FIG. 6 is a flow diagram illustrating the processing of the set viewports component in one embodiment. The component controls the positioning and sizing of the start and end viewports. In one embodiment, the component may also allow the user to specify viewports with different aspect ratios that can be moved and resized as a group. The component allows a user to specify the relative position of the viewports with different aspect ratios. For example, a relative position may indicate that all the viewports share the same center point, the same corner point, and so on. In block 601, the component displays an outline of the start viewport. The start and end viewports may have initial sizes and positions specified by the planning system. In block 602, the component displays an outline of the end viewport. The component may display the viewports using different attributes (e.g., different colors) to distinguish the start viewport from the end viewport. One skilled in the art will appreciate that the viewports can be of an arbitrary shape such as rectangular, circular, heart, star, and so on. In addition, when the start viewport and the end viewport may have a different shapes, an interpolation function may be used to define the viewport shape as it transitions from the start viewport shape to the end viewport shape. In block 603, the component receives user input. In decision block 604, if the user indicates to resize a viewport, then the component continues at block 605 to control the resizing of the viewport and then loops to block 601, else the component continues at block 606. In decision block 606, if the user specifies to move a viewport, then the component continues at block 607 to control the moving of the viewport and loops to block 601, else the component continues at block 608. In decision block 608, if the user specifies completion of the manipulation of the viewports, then the component completes, else the component performs other processing specified by the user such as changing the attributes or shape of a viewport as indicated by the ellipses.

Figure 7:
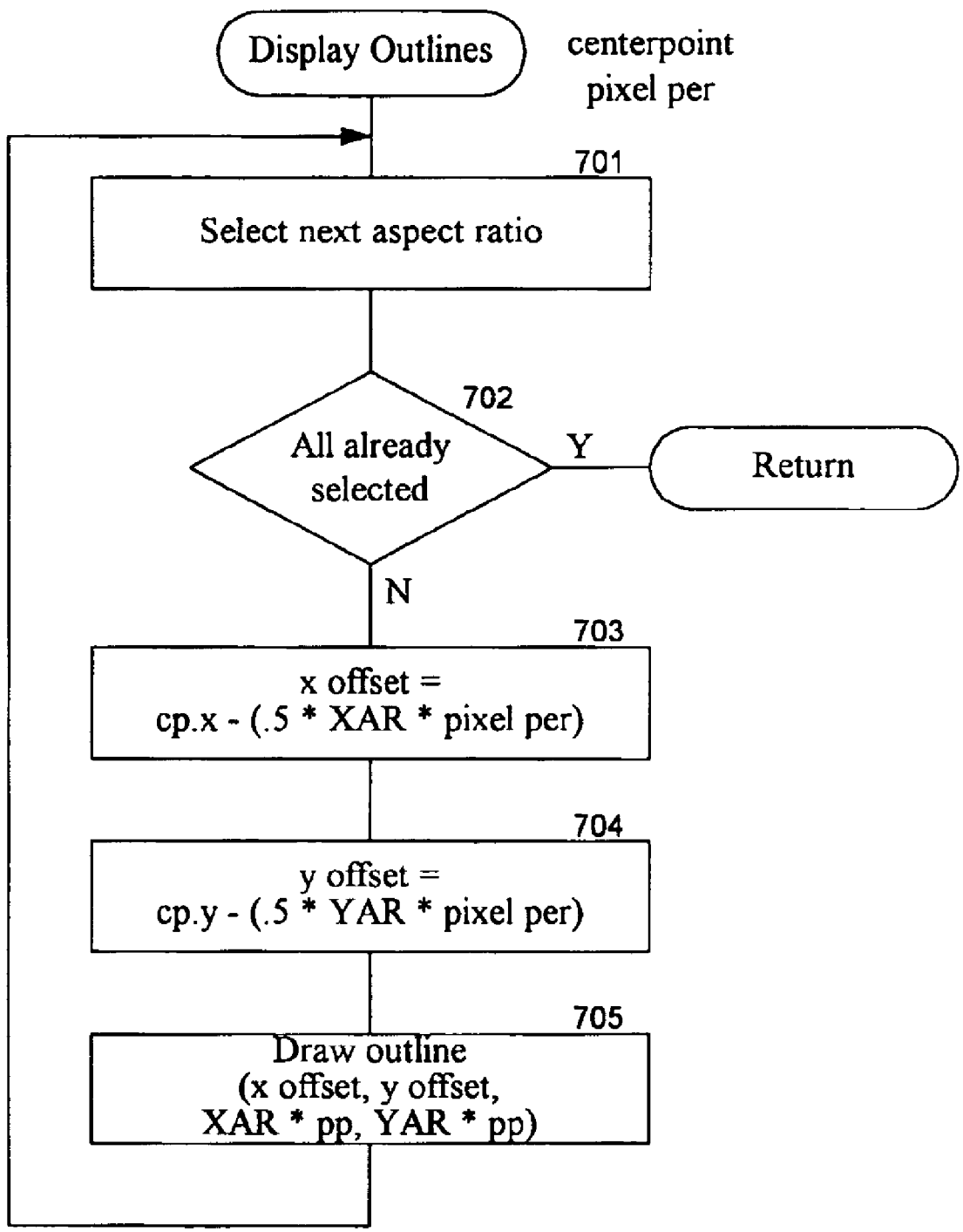
FIG. 7 is a flow diagram illustrating the processing of the display outline component in one embodiment.

FIG. 7 is a flow diagram illustrating the processing of the display outline component in one embodiment. In this embodiment, the component displays outlines representing viewports with different aspect ratios at a common center point. The component is passed an indication of the center point and the number of pixels per unit of an aspect ratio. In blocks 701–705, the component loops selecting and displaying the outline for each aspect ratio. In block 701, the component selects the next aspect ratio. In decision block 702, if all the aspect ratios already been selected, then the component returns, else the component continues at block 703. In block 703, the component sets the x coordinate of the upper-left location of the viewport to the x coordinate of the center point minus one half of the x value of the aspect ratio times the number of pixels per aspect ratio unit. For example, if the x coordinate of the center point is 100, the aspect ratio is 16:9, and the pixels per unit are 5, then the x coordinate of the upper-left corner of the rectangular viewport is 60 (e.g., 100−(0.5*16*5)). In block 704, the component sets the y coordinate of the upper-left corner of the viewport to the y coordinate of the center point minus one half of the y value of the aspect ratio times the number of pixels per aspect ratio unit. In block 705, the component draws the outline of the viewport positioned at the designated upper-left corner and loops to block 701 to select the next aspect ratio.

Figure 8:
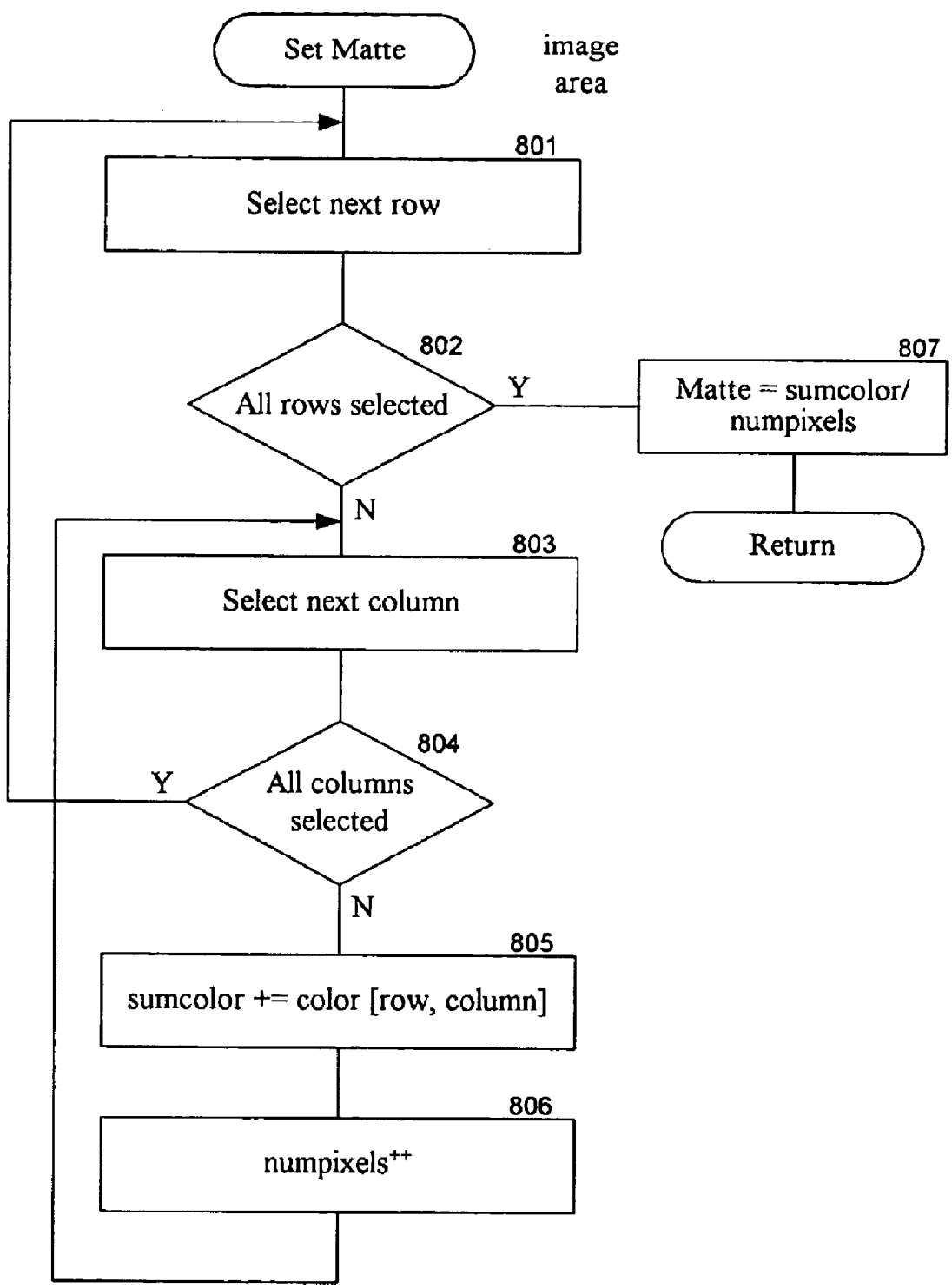
FIG. 8 is a flow diagram illustrating the setting of the color of the matte in one embodiment.

FIG. 8 is a flow diagram illustrating the setting of the color of the matte in one embodiment. In this embodiment, the component is passed an indication of the area of the image from which the color is to be derived. The component averages the color values of the pixels within that area and uses that average color as the color of the matte. In block 801, the component selects the next row of the image area. In decision block 802, if all the rows have already been selected, then the component continues at block 807, else the component continues at block 803. In block 803, the component selects the next column of the selected row. In decision block 804, if all the columns of the selected row have already been selected, then the component loops to block 801 to select the next row, else the component continues at block 805. In block 805, the component adds the color of the pixel indicated by the selected row and the selected column to a running total of the color values of the pixels. In one embodiment, the component calculates a separate total for the each component of the color, such as red, green, and blue components. In block 806, the component increments the number of pixels in the area and then loops to block 803 to select the next column within the selected row. In block 807, the component calculates the color of the matte by dividing the sum of the colors by the number of pixels and then returns. In one embodiment, the planning system may allow a user to specify rules for selecting the color of the matte that is to be displayed when an image is displayed. The planning system may also allow a user to specify the area of the image from which the matte color is automatically derived, or the planning system may automatically select the area. The automatic selection may, for example, use an algorithm to identify the area surrounding the subject of the image or to identify background area. The rules may specify to select a complimentary color to the average color of the subject area, to not allow certain colors (e.g., brown) to be the matte color, and so on; the matte color may also change as the image is panned. For example, the matte color may be the average color of the current viewport.

Figure 9:
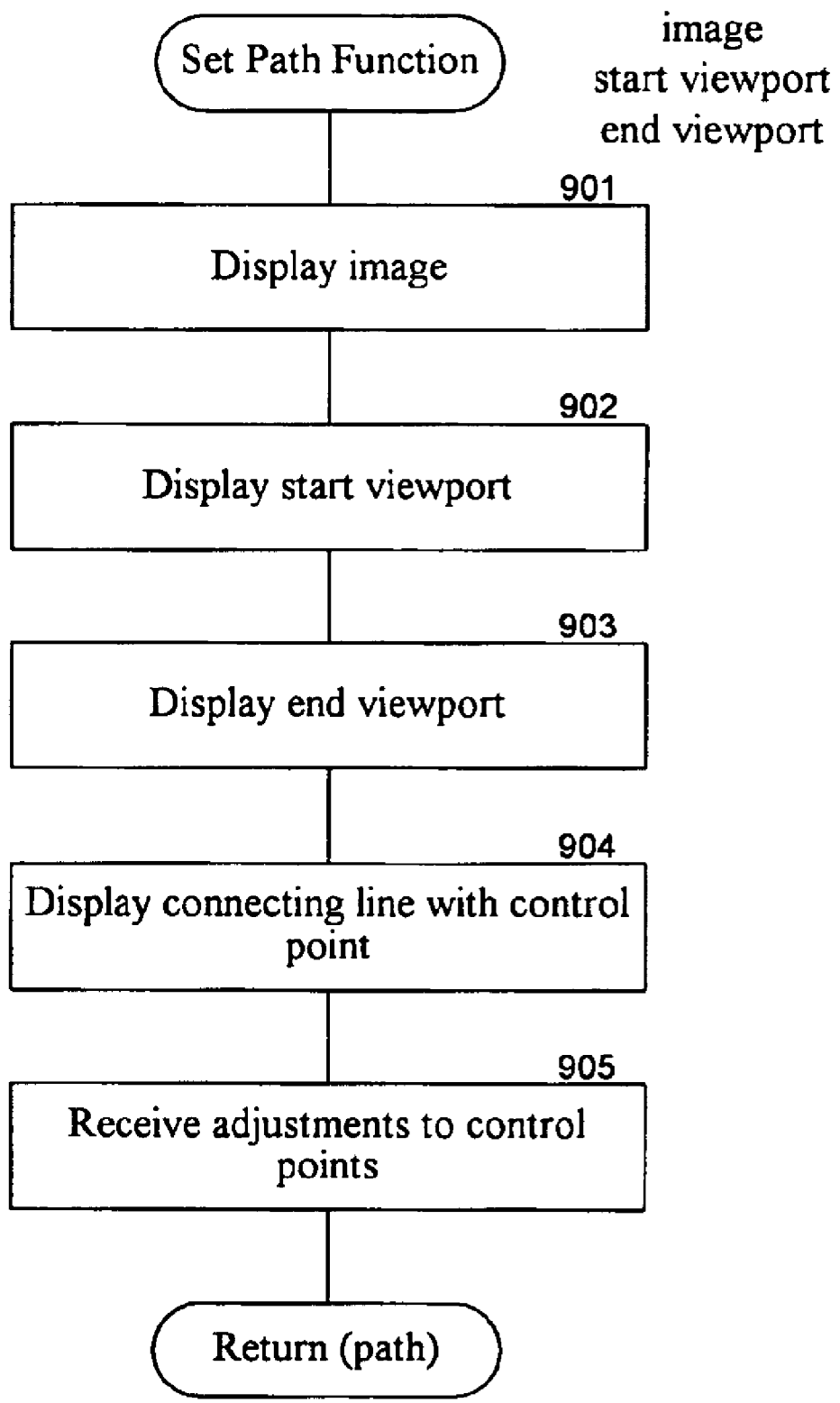
FIG. 9 is a flow diagram illustrating the processing of the set path function component in one embodiment.

FIG. 9 is a flow diagram illustrating the processing of the set path function component in one embodiment. The component is passed an indication of the image and the start and end viewports. The component allows the user to manipulate the control points of a line defining the pan path that extends from the center of the start viewport to the center of the end viewport. In block 901, the component displays the image. In block 902, the component displays the start viewport. In block 903, the component displays the end viewport. In block 904, the component displays a line connecting the center points of the start and end viewports. The line may include handles representing control points for controlling the shape of the pan path. In block 905, the component receives the adjustments for the control points. The component then returns the function defining the pan path as defined by the position of the control points.

Figure 10:
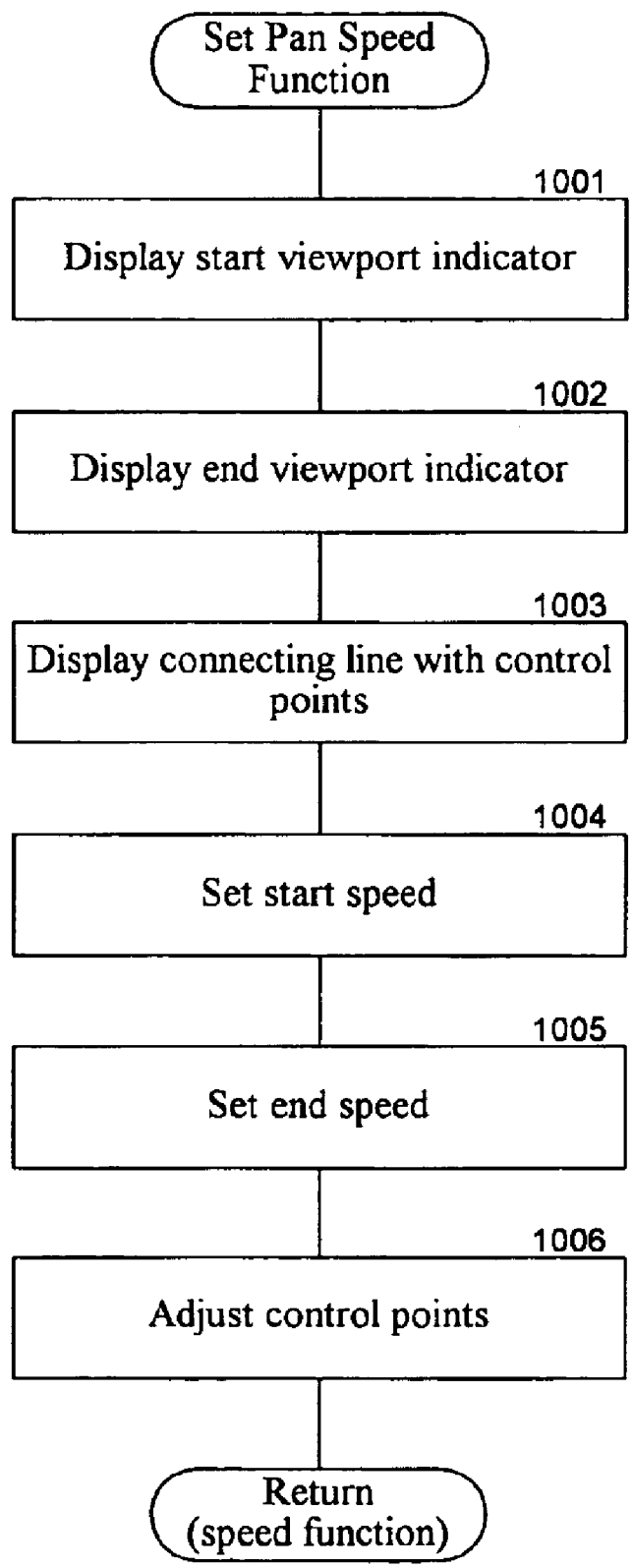
FIG. 10 is a flow diagram representing the processing of the set pan speed function component in one embodiment.

FIG. 10 is a flow diagram representing the processing of the set pan speed function component in one embodiment. The component displays an indication of a speed-versus-time coordinate system and allows the user to define a function specifying the speed of the pan over time. In block 1001, the component displays a start viewport indicator corresponding to a time of zero. In block 1002, the component displays an end viewport indicator corresponding to the pan time. In block 1003, the component displays a line connecting the start viewport and the end viewport. The connecting line is initially horizontal to indicate a constant speed of the pan. In block 1004, the component allows the user to set the start speed by moving the start viewport to a faster or slower speed. In block 1005, the component allows the user to set pan the end pan speed by allowing the user to move the end viewport indicator to a different speed. In block 1006, the component allows a user to adjust the positions of the control points of the line to specify the speed function. The component then returns the pan speed function based on the position of the control points. One skilled in the art will appreciate that a component for specifying a zoom speed function would operate in a similar manner.

One skilled in the art will appreciate that although specific embodiments of the planning system have been described herein for purposes of illustration, various modifications may be made without deviating from the spirit and scope of the invention. In one embodiment, the color of the line representing a pan path may be varied to represent the pan speed along the pan path. For example, high intensity yellow may represent a slow pan speed, high intensity green may represent the average pan speed, and high intensity blue may represent a fast pan speed. Also, the thickness of the line may represent the zoom speed or the size of the viewport. In addition, the contents of each aspect ratio of a viewport may be displayed separately from the displayed image so that a user can see what the contents of each aspect ratio will look like separately. The planning system may also define the functions for pan path, pan speed, zoom speed, and zoom size by a map of discreet values such as zoom size to zoom speed. When a viewport is displayed by a display device controller, the controller may enlarge the content of each viewport to fill the display or may display the content of each viewport with a size based on the relative viewport sizes. Zooming, as used herein, refers to changes in viewport size, regardless of the size at which the content of a viewport is ultimately displayed. Accordingly, the invention is not limited except by the appended claims.

We claim:

1. A method in a computer system for specifying zoom size while zooming an image, the method comprising:

displaying a start indication of a viewport at a location indicating a start zoom size at the start of zooming;

displaying an end indication of the viewport at a location indicating an end zoom size at the end of zooming;

displaying a line between the displayed start indication and the displayed end indication; and in response to receiving from a user an indication to change the shape of the displayed line, displaying the line with the changed shape wherein the size of the viewport when zooming is defined by the shape of the line.

2. The method of claim 1 wherein when the line is straight, the zoom size changes linearly over a zoom time.

3. The method of claim 2 wherein when the line is horizontal no zooming occurs.

4. The method of claim 2 wherein when the line is vertical no zooming occurs.

5. The method of claim 2 including in response to receiving from the user an indication to change the shape of the line, displaying a line that is not straight to indicate that change in the zoom size is non-linear.

6. The method of claim 1 including displaying handles for user selection when changing the shape of the line.

7. The method of claim 1 wherein the shape of the line is indicated by specifying locations of control points of the line.

8. The method of claim 7 wherein the shape of the line corresponds to a spline curve based on the control points.

9. The method of claim 1 wherein the line is displayed in a two axis coordinate system and wherein an axis corresponds to zoom size and another axis corresponds to zoom time.

10. The method of claim 1 wherein the line is displayed in a two axis coordinate system and wherein an axis corresponds to zoom size and another axis corresponds to pan path distance.

11. The method of claim 1 wherein the user indicates to change the zoom size by dragging a displayed indication of the zoom size.

12. The method of claim 1 including providing a zoom size function that maps zoom size to zoom time based on the start zoom size and the end zoom size.

13. The method of claim 1 wherein the size of the start indication reflects the size of the viewport at the start of zooming.

14. The method of claim 1 wherein the size of the end indication reflects the size of the viewport at the end of zooming.

15. A method in a computer system for specifying viewport size when panning an image, the method comprising:

displaying a start viewport size indication;

displaying an end viewport size indication;

displaying a line between the start viewport size indication and the end viewport size indication; and receiving from a user an indication to change the shape of the line wherein the shape of the line indicates the viewport size during panning.

16. The method of claim 15 wherein the viewport is centered around a single location while panning.

17. The method of claim 15 wherein the shape of the line includes the slope of the line.

18. The method of claim 15 wherein the line with a shape that is straight indicates that any change in size is linear.

19. The method of claim 15 wherein the line with a shape that is not straight indicates that a change in size in non-linear.

20. The method of claim 15 including in response to receiving from a user an indication change a viewport size indication, moving the displayed viewport size indication to a new location indicating the changed viewport size.

21. The method of claim 20 including resizing the displayed viewport size to indicate the changed viewport size.

22. The method of claim 20 including displaying handles for user selection when changing the shape of the line.

23. The method of claim 20 wherein the shape of the line is indicated by specifying locations of control points of the line.

24. The method of claim 23 wherein the shape of the line corresponds to a spline curve based on the control points.

25. The method of claim 20 wherein the line is displayed based on a two-axis coordinate system and wherein viewport size is represented on one axis and pan time is represented on another axis.

26. The method of claim 20 wherein the line is displayed based on a two-axis coordinate system and wherein viewport size is represented on one axis and pan distance is represented on another axis.

27. A computer system for specifying viewport size while panning an image, comprising:

a component that displays a line that maps a pan attribute to viewport size;

a component that receives from a user an indication to change the shape of the displayed line; and a component that stores an indication of the shape of the line for use in determining viewport size at different times during panning.

28. The system of claim 27 wherein the shape of the line includes the slope of the line.

29. The system of claim 27 wherein the indication to change the shape of the displayed line indicates a new start viewport size.

30. The system of claim 27 wherein the indication to change the shape of the displayed line indicates a new end viewport size.

31. The system of claim 27 wherein the component that receives from a user an indication to change the shape of the displayed line displays handles for user selection when changing the shape.

32. The system of claim 27 wherein the line is displayed based on a two-axis coordinate system and wherein viewport size is represented on one axis and pan location is represented on another axis.

33. The system of claim 27 wherein the line is displayed based on a two-axis coordinate system and wherein viewport size is represented on one axis and pan time is represented on another axis.

34. The system of claim 27 wherein the pan attribute is pan distance.

35. The system of claim 27 wherein the pan attribute is pan time.

* * * * *

UNITED STATES PATENT AND TRADEMARK OFFICE
CERTIFICATE OF CORRECTION

PATENT NO. : 6,956,589 B2
DATED : October 18, 2005
INVENTOR(S) : Scott E. Lipsky et al.

Figure 5:
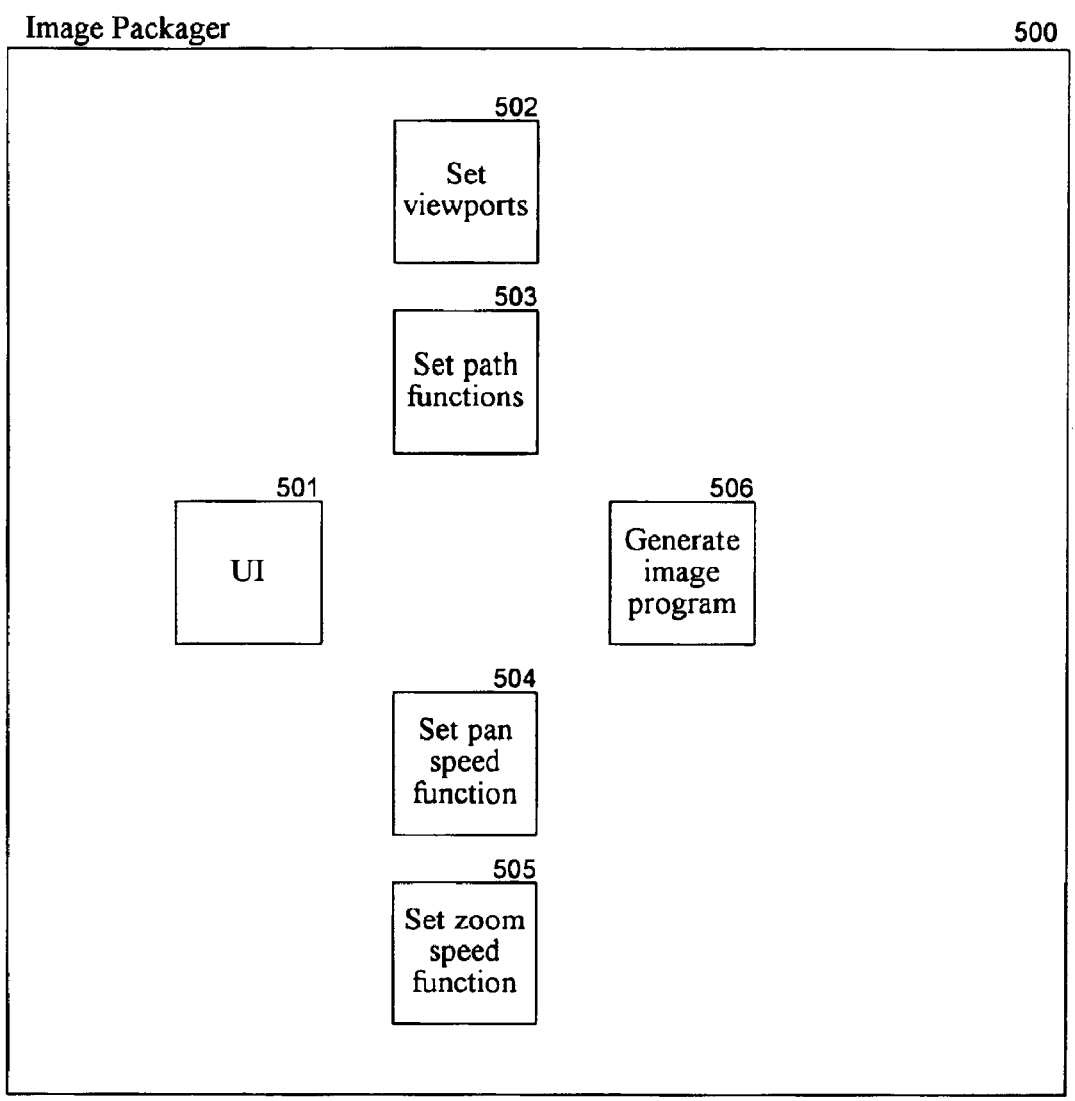
FIG. 5 is a block diagram illustrating components of the planning system in one embodiment.

It is certified that error appears in the above-identified patent and that said Letters Patent is hereby corrected as shown below:

Column 7,
Line 59, insert new paragraph as follows:

-- FIG. 5 is a block diagram illustrating components of the planning system in one embodiment. The planning system 500 includes a user interface component 501, a set viewports component 502, a set pan path function component 503, a set pan speed function component 504, a set zoom speed function component 505, and a publish image plan component 506. The user interface component receives user commands, invokes the appropriate components to perform those commands, and updates the display accordingly. The set viewport component controls the establishing of the viewport including the position and size of the viewports. The set pan path function component controls the setting of the pan path between the start viewport and the end viewport. In one embodiment, the component initially displays a straight line with control points between the center points of the start viewport and the end viewport. The user can then move the control points to change the shape of line with the resulting function defining the pan path between the start viewport and the end viewport. In one embodiment, the path is defined by a spline curve based on the position of control points. The set pan speed function component displays a representation of the start viewport and the end viewport relative to a speed axis and a time axis. The time axis represents the pan time (e.g., 15 minutes), and the speed axis represents the speed of the pan over the pan time. The average pan speed is the pan distance (e.g., in number of pixels) as defined by the pan path function divided by the pan time, regardless of the specified pan speed function. As a result, the pan speed function specifies a relative speed, rather than an absolute speed. The set zoom speed function component operates in a similar manner to the set pan speed function component except for controlling the zoom speed. Although not shown in FIG. 5, the planning system may also have a set zoom size function component that is used to specify the zoom size during zooming. A user may specify the zoom size by changing the shape of a line connecting an indication of the start and end viewports that is displayed on a coordinate system with the x-axis representing zoom time and the y-axis representing zoom size. Also, the sizes of the indicators of the start and end viewports may represent the relative sizes of the viewports themselves and may include the content of the viewport. --.

Signed and Sealed this

Seventh Day of March, 2006

JON W. DUDAS
*Director of the United States Patent and Trademark Office*